United States Patent [19]

Corren

[11] Patent Number: 4,827,410
[45] Date of Patent: May 2, 1989

[54] COMPUTER SYSTEM USER INTERFACE

[76] Inventor: Dean R. Corren, 46 Stuyvesant St., New York, N.Y. 10003

[21] Appl. No.: 887,316

[22] Filed: Jul. 21, 1986

[51] Int. Cl.[4] .............................................. G06F 3/03
[52] U.S. Cl. ................................................... 364/200
[58] Field of Search ... 364/200 MS File, 900 MS File, 364/475, 512; 178/18; 340/815.31, 707, 708

[56] References Cited

U.S. PATENT DOCUMENTS

| | | | |
|---|---|---|---|
| 4,190,833 | 2/1980 | Bejting et al. | 340/707 |
| 4,313,109 | 1/1982 | Funk et al. | 340/365 P |
| 4,419,539 | 12/1983 | Arrigoni | 340/815.31 |
| 4,430,526 | 2/1984 | Brown et al. | 178/18 |
| 4,475,239 | 10/1984 | Raamsdonk | 382/57 |
| 4,530,061 | 7/1985 | Henderson et al. | 364/475 |
| 4,550,250 | 10/1985 | Mueller et al. | 250/203 R |
| 4,551,810 | 11/1985 | Levine | 364/512 |
| 4,562,482 | 12/1985 | Brown | 358/254 |
| 4,565,999 | 1/1986 | King et al. | 340/708 |
| 4,571,072 | 2/1986 | Bourbeau et al. | 355/132 |
| 4,602,907 | 7/1986 | Foster | 340/707 |
| 4,620,107 | 10/1986 | Frame | 340/707 |
| 4,656,603 | 4/1987 | Dunn | 364/900 |
| 4,689,614 | 8/1987 | Strachan | 340/707 |
| 4,695,831 | 9/1987 | Shinn | 340/707 |

*Primary Examiner*—David Y. Eng
*Attorney, Agent, or Firm*—Sprung Horn Kramer & Woods

[57] ABSTRACT

A computer system is provided with a computer having a communications input port and circuitry for controlling a display, a planar work surface, a display connected to the computer display control circuitry and having a screen disposed substantially in the plane of and within the work surface a digitizer including a pointing device connected to the communications input port of the computer and defining a digitizing area including the screen and portions of the work surface surrounding the display screen. As a result, the screen and the portions of the work surface surrounding the display screen can be digitized by positioning the pointing device thereon.

10 Claims, 2 Drawing Sheets

COMPUTER SYSTEM USER INTERFACE

BACKGROUND OF THE INVENTION

The present invention relates to a computer system and in particular to a user interface for a computer system which is useful with application software, for example, spread sheets, data bases, graphics, games and communication and most preferably with word processing and computer aided design software.

The use of computer systems, while becoming an increasingly essential part of many businesses, is still limited by the problems associated with the user interface. These problems include the lack of speed with which the user can input data and commands, the discomfort associated with working at a computer and the lack of acceptance of the interface due to the complex commands that must be used to carry out computer operations.

The most common interface device for computer systems, the keyboard, is an awkward and unfamiliar device to many, especially executives, and is ill suited to all tasks except text or data entry.

Other interface devices such as mice, touch screens, light pens, digitizers and touch pads have significant drawbacks that are addressed by the present invention.

An example of a keyboard interface work station can be seen in U.S. Pat. No. 4,562,482, an example of a touch screen input device can be seen from U.S. Pat. No. 4,313,109 and an example of a digitizer graphics input device can be seen in U.S. Pat. No. 4,550,250.

These disadvantages have apparently not gone unnoticed and are the subject of work in the prior art. For example, U.S. Pat. No. 4,190,833 teaches the use of an alpha numeric terminal comprising a text generator and a display unit consisting of a cathode ray tube screen arranged to display a plurality of lines of text on half of the screen and a set of alpha numeric characters on the other half of the screen which can be selected by the use of a light pen.

While this system eliminates the need for a keyboard, it substantially reduces the area of the screen which can be used to display text and still necessitates the use of a separate device for moving the cursor to indicate a desired location in the text on the screen.

U.S. Pat. No. 4,475,239 apparently recognized that the most comfortable way of editing and processing a printed text is to work on the text itself. In this apparatus, a printed piece of paper is placed in a digitizer field so that portions of the printed text on the paper can be edited by the user.

The disadvantage of this system is that after all of the text editing changes are made, the changes are fed into a computer so that the memory thereof can be updated and the text is again printed out in final form to enable the user to see the result of the changes. However, if the user desires to enter new text information while text editing, this must be still done by a keyboard. Moreover, there is no real time display, since the results of the changes are not displayed until after all of the changes have been entered and the text printed out, and there is no way of knowing if the changes that have been requested are correct until sometime thereafter.

In U.S. Pat. No. 4,430,526 an interactive graphics transmission system is disclosed wherein a light pen is used to indicate writing and erasing of a graphic image within a specific image area which is then transmitted via video camera to a graphics display terminal. Since the light pen is not used with the display screen itself, it is no different than a mouse or other input device, with the exception that the image area on which it is operating, is transmitted via video for video teleconferencing.

SUMMARY OF THE INVENTION

The present invention results from the recognition that the most comfortable method for editing documents and for doing design work involves using a writing utensil directly on a document which is lying on a desk.

The main object of the present invention is to provide such a natural interactive user interface with a computer so as to result in a fully integrated system of a microcomputer in an ergonomic desk that would increase speed and comfort for the proficient computer professional and create a much more "user-friendly" computer system for executives and other professionals who have resisted the use of computers because of having to deal with a keyboard.

These and other objects are achieved in accordance with the invention wherein a computer system is provided comprising a computer having a communications input port and means for controlling a display; a planar work surface; display means connected to the computer display control means and having a screen disposed substantially in the plane of and within the work surface and digitizing means including a pointing device connected to the communications input port of the computer and defining a digitizing area including the screen and portions of the work surface surrounding the display screen, whereby the screen and said portions of the work surface can be digitized by positioning the pointing device thereon.

The computer system has means for associating predetermined locations on said portions of the work surface surrounding the display screen with selected text and commands to effect the inputting of text and commands into the computer in response to the positioning of the pointing device on said predetermined locations and means responsive to the positioning of the pointer device on a given screen location displaying one of alphanumeric and graphic information for carrying out command inputted by the pointing device on the given screen and controlling the display means to display the result.

The computer has means for determining when the pointer device is located on a given screen location displaying one of alphanumeric and graphic information and means for carrying out operations on the displayed information at said given screen location and for controlling the display means to display the result.

The display preferably has a planar screen disposed substantially in the plane of the work surface and the work surface and the screen are preferably mounted for angular displacement about a pivot axis disposed parallel to the work surface.

The system can include a desk having a desk top, wherein the work surface constitutes at least a portion of the desk top and means mounting the work surface for angular displacement relative to the remainder of the desk top or at least to the horizontal about a pivot axis parallel to the desk top or horizontal.

The present invention also is achieved by a word processing system comprising a computer programmed to be responsive to a set of commands for carrying out a plurality of word processing operations on alphanumeric text and having a communications input part and means for controlling a display, a planar work surface, display means connected to the computer display control means and having a screen disposed substantially in the plane of and within the work surface locations disposed in a plurality of lines, digitizing means including a pointing device connected to the communications input port of the computer and defining a digitizing area including the screen and portions of the work surface surrounding the display screen. The computer system has means for associating predetermined areas on said portions of the work surface surrounding the display screen with text in the form individual letters of the alphabet and numbers from 0 to 9 and optionally numerous other standard and custom symbols with individual ones of the set of commands, means for inputting text and commands into the computer in response to the positioning of the pointing device on the locations associated therewith and means responsive to the positioning of the pointer device on a given screen location for effecting a word processing operation on the displayed text in accordance with one of the set of commands inputted by positioning the pointing device on the area associated therewith and for controlling the display means to display the result of the operation on the screen location.

The system in accordance with the present invention includes a work station having a personal computer built into it and which is fully hardware and software compatible with standard microcomputer products.

The key components of the system in accordance with the present invention are a plasma display or flat screen CRT or electroluminscent display or other flat display which is built into a desk or work surface, easy adjustment of the surface for height and/or tilt, an ultrasonic digitizer pen or other type of digitizer pen user interface, and interface software for existing application software including CAD software and word processing software.

The key feature of the present invention is the embedding of a flat display within a larger digitizer area. By disposing the display within the digitizer area and making the computer capable of recognizing when the digitizer pointing device is on the screen and pointing to a specific location or is on the work surface surrounding the screen and in the digitizer area, text and commands can be entered with the same device by the same circuitry. This means that certain portions of the digitizer area surrounding the screen can be associated with commands for carrying out computer operations on the displayed information so that the pointing device can be placed on the area associated with a particular command for selecting the command and then the pointing device can be placed over a given location on the screen so that the command is carried out on the data displayed in that location on the screen, with the computer carrying out the operations corresponding to the command and immediately displaying the results in that location on the screen. Alternatively, the pointing device can be used first to point to a screen location and then a command to effect an operation on the selected text.

It is immediately apparent that as a result of the present invention, no switching of operating modes are required and therefore no time is wasted between manipulating text and entering commands. When one compares this with a keyboard wherein one must move his or her hand back and forth to cursor keys and use control-key combinations for commands or when compared to the keyboard with a mouse where one must move back and forth to the mouse, it is clear that the present invention provides the user with a much more comfortable and simpler method of interfacing with a computer. Moreover, the mouse and keyboard require the user to move the cursor. The new method simply requires the user to point to the new desired location for the cursor.

By using the same surface which is preferably disposed flat on the top of a desk, ideal ergonomics are created for both the neck/head/eyes and the arms/hand. One is able to work on this system like a draftsman at a drafting table who writes and looks on the same surface which can be adjusted for optimum comfort.

Because the digitizer area which is available is larger than the display screen area, there is room for a large number of commands which can be represented on the surface in the English language or other convenient system merely by placing a template on the work surface. Thus no complicated control code combinations need be learned by the user and therefore the learning time for the software being used is sharply reduced. Moreover, there is less need to refer to manuals or help screens for lesser used commands, since they can be disposed right on the work surface with an English language name.

Another key advantage of the system in accordance with the present invention is the ability of the system to establish and define macro instruction commands which can be associated with initially blank areas on the digitizer work surface and into which blocks of text or command operations can be saved for subsequent recall. This is equivalent to having a very large number of user programmable function keys, but with the added advantage that the keys can be readily labelled by the user and therefore easy to locate for recall.

This means on-the-fly macro definition is more convenient than in prior art systems wherein one must remember a particular key combination to recall a macro and is made possible by the large area of the digitizer and the high resolution of the digitizer which permit flexible and comprehensive formation of command areas around a screen. The digitizer also enables the user to pin point a particular location so that a single character can be changed on a screen by pointing to it with the pointing device of the digitizer.

As can be seen from the above, the advantage of the present invention for computer aided design (CAD) systems is that it replaces state of the art CAD systems which still use vertical screen monitors even though the use of a light pen quickly becomes uncomfortable for the arm of the user and the hand/eye interaction with a mouse or digitizer is poor. In accordance with the present invention, one is able to look down on the work and work directly on the design. Everything adjusts for the comfort of the user since neither the arm holding the pen nor the users neck is strained. Existing CAD software for IBM PC compatible computers such as AUTOCAD, CADKEY, VERSICAD is readily adaptable to the control interface.

It will also be immediately recognized that the present invention is particularly useful for word processing. While text entry may be better done by way of a keyboard, text editing is done best by the natural user interface afforded by the present invention. Text editing does not require the keyboard at all, since editing would be done as one would edit a paper with a pen, that is, all editing and proofreading commands are supported either by natural pen movements or touching a specific area on the work surface, and by the pointing of the pointing device or pen on the text information on the screen.

The advantage of the present invention over editing with paper and pen is that all changes are seen immediately in context and when the editing is done, the document is finished in the computer memory and ready to print. In addition, a record can be automatically kept of all changes.

These and other advantages and features of the present invention will be more clearly understood from the following detailed description of the invention taken in conjunction with the attached drawings, wherein:

DETAILED DESCRIPTION OF THE INVENTION

Figure 1:
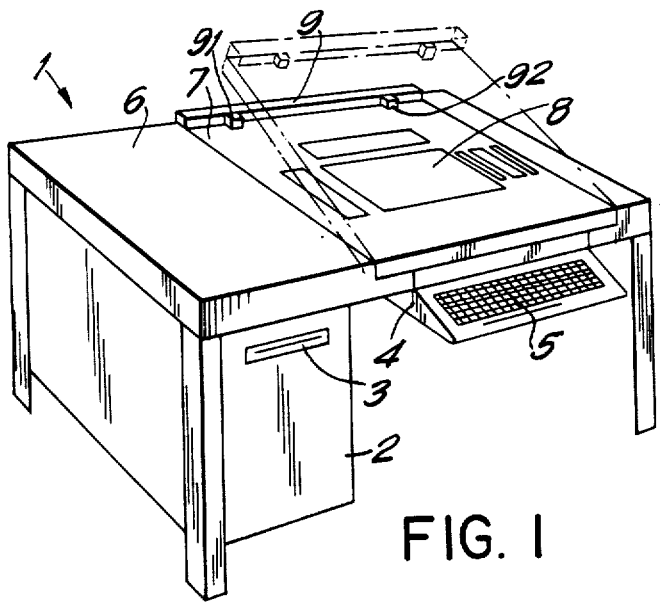
FIG. 1 is a perspective view of a computer system work station in accordance with the present invention.
Figure 2:
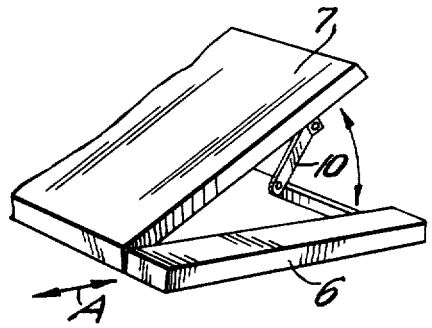
FIG. 2 is a partial perspective view of the work surface in accordance with the present invention.
Figure 3:
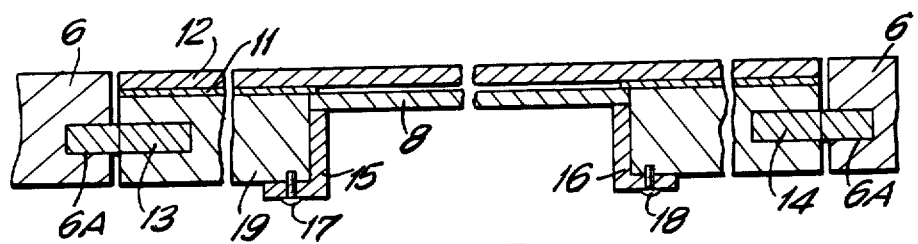
FIG. 3 is a sectional view of the mounting of the display on the work surface as shown in FIG. 1.

Referring now to FIGS. 1-3, the work station 1 in accordance with the present invention is fashioned after a conventional desk having a planar desk top 6. Mounted under the desk is the computer processor 2 with a disk drive 3 and a sliding shelf 4 holding a standard keyboard 5.

The system also includes a digitzer 9, which in the embodiment shown herein is an ultrasonic digitizer with microphones 91 and 92 mounted at the rear of the desk and defining a digitizer area 95 in which any location in the area pointed to by a pointing device, in this case ultrasonic pen 93, will generate data corresponding to the location of the pen 93 for feeding into the computer 2.

The portion of the desk top surface 6 which overlaps with the digitizer area 95 is defined as the work surface 7 of the system.

An important feature of the present invention is that the display screen 8 is disposed substantially in the plane of work surface 7 and thus within the digitized area 95.

In a preferred embodiment of the present invention, the work surface 7 is adjustable by pivoting angularly around a pivot axis defined by pins 13, 14 in slota 6A and is releasably retained in any desired angular position, as shown in FIG. 2, between the angles of 0° approximately 80°, by means of a support bracket 10. The work surface 7 is also movable fore and aft in the direction of Arrow A.

As can be seem in FIG. 3, the screen 8 is preferably a flat screen which is mounted on brackets 15, 16 which in turn are mounted into member 19 via screws 17, 18. Overlying member 19 is a black paper member 11 and the entire work surface 7 is covered by a sheet of nonglare glass 12 which is dimensioned so that it is flush with the desk top 6.

Figure 4:
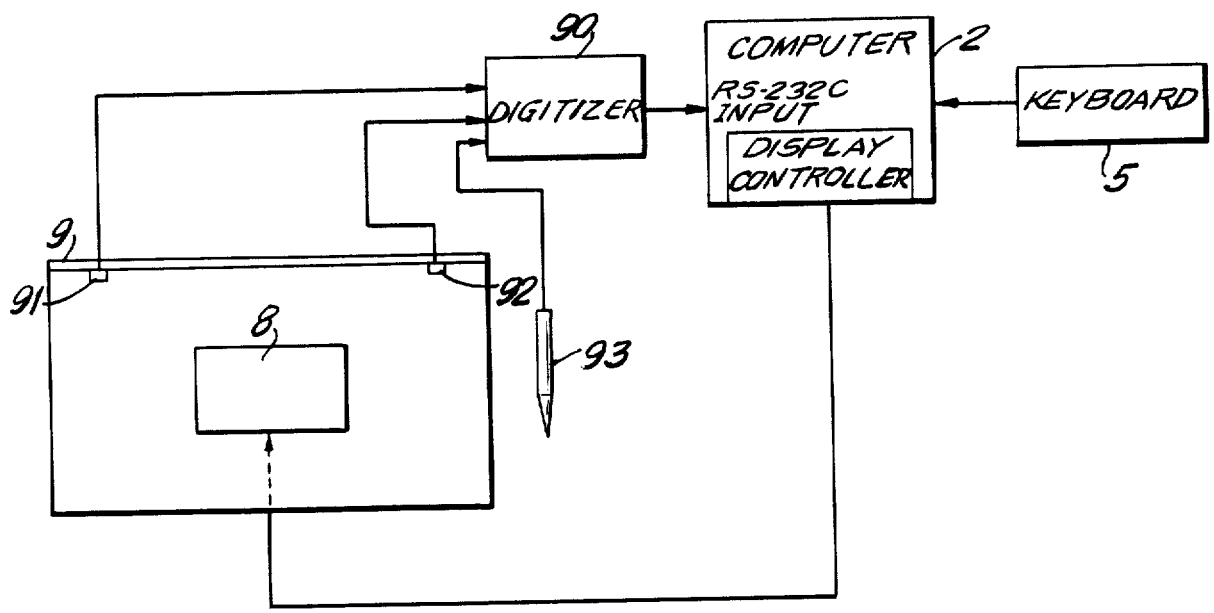
FIG. 4 is a schematic block diagram of the interactive computer system in accordance with the present invention.
Figure 5:
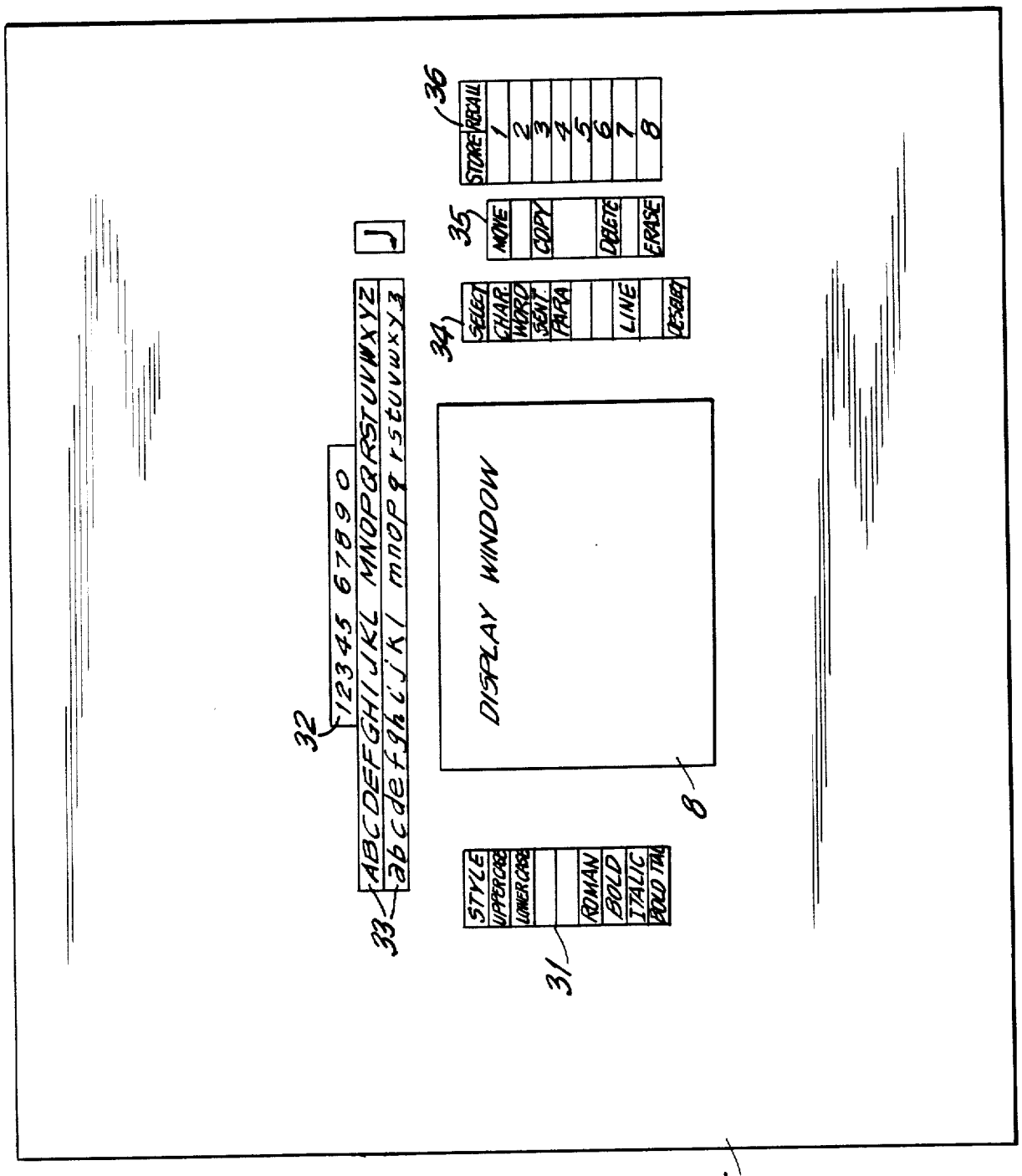
FIG. 5 is a detailed view of the work surface of FIG. 4 arranged for word processing.

The system in accordance with the present invention is shown more clearly with reference to FIGS. 4 and 5.

As shown therein, the microphones 91 and 92 of the digitizer 9 have their outputs, as well as the output of pen 93 fed to digitizer interface 90 which in turn feeds its output to the RS 232C input of a microcomputer 2. The microcomputer 2 has a built-in display controller and its output is fed directly to the display screen 8. Computer 2 also receives inputs from the keyboard 5.

The only requirements for computer 2 is that it have a serial or parallel communications port that is compatible with a digitizer. The computer must also be able to be programmed to recognize input from the digitizer as a screen location, a command or alpha numeric data.

In one embodiment, a model GP-7 Graphbar digitizer by Science Accessories Corporation with an RS232C serial interface was connected to a Panasonic model FT-70 IBM PC compatible computer. The display is a Panasonic plasma display with a display controller which emulates the standard IBM Color Graphics Adaptor. The digitizer can also be magnetic or any non surface-specific or clear surface digitizer.

The display screen however can be a liquid crystal display, an electroluminescent display or a vacuum fluorescent display or flat screen CRT.

In order to carry out a word processing or computer aided design application, any standard word processing or CAD program can be used. These programs have standard commands which are used to carry out word processing or CAD operations on text or graphic data. Other application software can also be used with the system, for example, spread sheets, data base management, project management, graphics, games and communications.

In accordance with the present invention, the computer system has means for associating predetermined locations on portions of the work surface 7 surrounding the display screen 8 with selected text and commands to effect the inputting of the text and commands into the computer in response to the positioning of the pen 93 on those locations. This is illustrated in FIG. 5 wherein the digitizer field 95 is shown and which is approximately 18" by 24" with the screen being approximately 5.8 by 7.6" and approximately centered in the digitizing area.

Disposed around the screen 8 are the predetermined locations which are associated with selected text and commands. For example, block 32 includes the numbers from 1 to 0 which can be input into the computer by disposing pen 93 thereover. Block 33 includes upper and lower case alphabet data.

In blocks 31, 34 and 35 are disposed word processing commands which are used during the editing of text material. It can be seen that the blocks can be identified by merely placing a plastic or a paper template underneath the glass 12 and on top of the black paper 11. Instead of glass, the top can be matte polycarbonate plastic sheet, e.g. Lexan TM.

Block 36 is an example of the ability of the system to include user defined macros which can be defined, stored and recalled by merely placing the digitizer pen over the proper location.

The computer is able to associate the predetermined locations 31–36 on the work surface with the selected text and commands by means of software which correlates the coordinates of the locations with the codes for the text and commands for a given word processing program.

The computer also has means responsive to the positioning of the pen 93 on a given screen location, that is, over any one of the 80 characters by 24 lines normally displayed on the screen, for indicating where a particular command or alphanumeric character should be located or should be acting on. This is carried out similarly to the previously mentioned associating of locations by determining the coordinates of each character and line on the screen so that when the digitizer pen 93 is over that location, the computer is able to translate the coordinates of the location to the screen memory location and thereby access the data at that location and effect the commands selected by the user.

These means are carried out in the preferred embodiment by software compatible with the MS DOS 3.1 operating system on an IBM PC compatible computer as set forth hereinafter in the attached appendix. Other computers and operating systems can be used in accordance with the invention.

As a result of this system, the commands selected by the digitizer pen 93 can be carried out on the display screen location over which the digitizer pen is positioned.

It will be appreciated that the instant specification and claims are set forth by way of illustration and not limitation, and that various modifications and changes may be made without departing from the spirit and scope of the present invention.

What is claimed is:

1. A computer system comprising:
    a computer having a communications input port and means for controlling a display;
    a planar work surface
    display means connected to the computer display control means and having a screen disposed substantially in the plane of and within the work surface; and
    digitizing means including a pointing device connected to the communications input port of the computer and defining a digitizing area including the screen and portions of the work surface surrounding the display screen, whereby the screen and said portions of the work surface can be digitized by positioning the pointing device thereon.

2. The computer system according to claim 1, wherein the computer has means for associating predetermined locations on said portions of the work surface surrounding the display screen with selected text and commands to effect the inputting of text and commands into the computer in response to the positioning of the pointing device on said predetermined locations and means responsive to the positioning of the pointer device on a given screen location displaying one of alphanumeric and graphic information for carrying out command inputted by the pointing device on the given screen and controlling the display means to display the result.

3. The computer system according to claim 1, wherein the computer has means for associating predetermined locations on said portions of the work surface surrounding the display screen with selected text and commands to effect the inputting of text and commands into the computer in response to the positioning of the pointing device on said predetermined locations.

4. The computer system according to claim 1, wherein the computer has means for determining when the pointer device is located on a given screen location displaying one of alphanumeric and graphic information and means for carrying out operations on the displayed information at said given screen location and for controlling the display means to display the result.

5. The computer system according to claim 1, wherein the display has a planar screen disposed substantially in the plane of the work surface.

6. The computer system according to claim 1, further comprising means mounting the work surface and the screen for angular displacement about a pivot axis disposed parallel to the work surface.

7. The computer system according to claim 1, further comprising a desk having a desk top and wherein the work surface constitutes at least a portion of the desk top.

8. The computer system according to claim 7, further comprising means mounting the work surface for angular displacement relative to the remainder of the desk top about a pivot axis parallel to the desk top.

9. The computer system according to claim 7, wherein the digitizing means comprises an ultrasonic digitizer.

10. A word processing system comprising:
    a computer programmed to be responsive to a set of commands for carrying out a plurality of word processing operations on alphanumeric text and having a communications input port and means for controlling a display;
    a planar work surface;
    display means connected to the computer display control means and having a screen disposed substantially in the plane of and within the work surface locations disposed in a plurality of lines; and
    digitizing means including a pointing device connected to the communications input port of the computer and defining a digitizing area including the screen and portions of the work surface surrounding the display screen;
    wherein the computer has means for associating predetermined areas on said portions of the work surface surrounding the display screen with text in the form individual letters of the alphabet and numbers from 0 to 9 with individual ones of the set of commands, means for inputting text and commands into the computer in response to the positioning of the pointing device on the locations associated therewith and means responsive to the positioning of the pointer device on a given screen location for effecting a word processing operation on the displayed text in accordance with one of the set of commands inputted by positioning the pointing device on the area associated therewith and for controlling the display means to display the result of the operation on the screen location.

* * * * *